(12) United States Patent
Wangüemert Pérez et al.

(10) Patent No.: US 12,265,256 B2
(45) Date of Patent: Apr. 1, 2025

(54) BRICKED SUB-WAVELENGTH PERIODIC WAVEGUIDE, MODAL ADAPTER, POWER DIVIDER AND POLARISATION SPLITTER THAT USE SAID WAVEGUIDE

(71) Applicant: UNIVERSIDAD DE MÁLAGA, Málaga (ES)

(72) Inventors: Juan Gonzalo Wangüemert Pérez, Málaga (ES); Íñigo Molina Fernández, Málaga (ES); Alejandro Ortega Moñux, Málaga (ES); Robert Halir, Málaga (ES); Jose Manuel Luque Gonzalez, Málaga (ES)

(73) Assignee: UNIVERSIDAD DE MÁLAGA, Málaga (ES)

( * ) Notice: Subject to any disclaimer, the term of this patent is extended or adjusted under 35 U.S.C. 154(b) by 237 days.

(21) Appl. No.: 17/922,350

(22) PCT Filed: Apr. 27, 2021

(86) PCT No.: PCT/ES2021/070279
§ 371 (c)(1),
(2) Date: Oct. 28, 2022

(87) PCT Pub. No.: WO2021/219913
PCT Pub. Date: Nov. 4, 2021

(65) Prior Publication Data
US 2023/0176266 A1 Jun. 8, 2023

(30) Foreign Application Priority Data
Apr. 29, 2020 (ES) ................... P202030367

(51) Int. Cl.
*G02B 6/124* (2006.01)
*G02B 6/122* (2006.01)
(Continued)

(52) U.S. Cl.
CPC ........... *G02B 6/124* (2013.01); *G02B 6/1228* (2013.01); *G02B 5/18* (2013.01); *G02B 5/30* (2013.01);
(Continued)

(58) Field of Classification Search
CPC ....... G02B 6/122; G02B 6/1228; G02B 6/124
See application file for complete search history.

(56) References Cited

U.S. PATENT DOCUMENTS 5,629,999 A * 5/1997 Henry .................... G02B 6/122
385/27
5,745,618 A * 4/1998 Li .......................... G02B 6/125
385/48
(Continued)

FOREIGN PATENT DOCUMENTS

CN 109031522 A * 12/2018
ES 2736899 A1 1/2020
(Continued)

OTHER PUBLICATIONS

J. Zou et al. Grating coupler with reduced back reflection using λ/4 offset at its grating sub-teeth. Journal of Lightwave Technology, 37:4:1195-1199, Feb. 15, 2019 (https://doi.org/10.1109/JLT.2018.2889863) (Year: 2019).*
(Continued)

*Primary Examiner* — Michael Stahl
(74) *Attorney, Agent, or Firm* — Hassan Abbas Shakir; Shakir Law PLLC (57) ABSTRACT

A bricked sub-wavelength periodic waveguide and a modal adapter, power divider and polarization splitter that use the waveguide. The waveguide includes blocks disposed periodically with a period "$L_z$" on a substrate and which alternate with a covering material. The first blocks have a width "$a_x$" and the second blocks have a width "$b_x$", alter-
(Continued)

nating on the substrate according to a period "$L_x$" the second blocks being shifted a distance "$d_z$" the first blocks in the direction of propagation. A modal adapter, a power divider and a polarization splitter all use the periodic waveguide and can operate with larger wave periods without leaving the sub-wavelength regime.

18 Claims, 8 Drawing Sheets

(51) Int. Cl.
| | |
|---|---|
| G02B 5/18 | (2006.01) |
| G02B 5/30 | (2006.01) |
| G02B 6/10 | (2006.01) |
| G02B 6/12 | (2006.01) |
| G02B 6/24 | (2006.01) |

(52) U.S. Cl.
CPC ...... *G02B 6/107* (2013.01); *G02B 2006/1209* (2013.01); *G02B 2006/1215* (2013.01); *G02B 2006/12154* (2013.01); *G02B 6/24* (2013.01); *G02B 2207/117* (2013.01)

(56) References Cited

U.S. PATENT DOCUMENTS

| | | | | |
|---|---|---|---|---|
| 6,892,004 | B1* | 5/2005 | Yu | G02B 6/12011 385/39 |
| 2001/0036338 | A1* | 11/2001 | Matsushima | G02B 6/1228 385/50 |
| 2005/0135748 | A1* | 6/2005 | Yamazaki | G02B 6/12011 385/129 |
| 2009/0310913 | A1* | 12/2009 | Bidnyk | G02B 6/12007 385/28 |
| 2011/0280533 | A1 | 11/2011 | Chang-Hasnain | |
| 2012/0281950 | A1* | 11/2012 | Fattal | G02B 6/30 385/37 |
| 2013/0209036 | A1* | 8/2013 | Morita | G02B 6/12014 385/37 |
| 2013/0279854 | A1* | 10/2013 | Morita | G02B 6/12011 385/37 |
| 2014/0153862 | A1* | 6/2014 | Picard | G02B 6/126 385/11 |
| 2014/0241661 | A1* | 8/2014 | Chen | G02B 6/124 385/11 |
| 2015/0247974 | A1* | 9/2015 | Painchaud | G02B 6/124 385/28 |
| 2015/0286006 | A1 | 10/2015 | Chang-Hasnain | |
| 2016/0341896 | A1* | 11/2016 | Horth | G02B 6/305 |
| 2017/0146738 | A1 | 5/2017 | Xu | |
| 2018/0095199 | A1* | 4/2018 | Li | G02B 6/1228 |
| 2020/0225412 | A1 | 7/2020 | González Andrade | |
| 2021/0033789 | A1* | 2/2021 | Villafranca Velasco | G02B 5/1809 |
| 2021/0263210 | A1 | 8/2021 | Halir et al. | |
| 2021/0311253 | A1* | 10/2021 | Bian | G02B 6/107 |

FOREIGN PATENT DOCUMENTS

| | | | |
|---|---|---|---|
| JP | 10-274719 A | * | 10/1998 |
| WO | 2019063464 | | 4/2019 |

OTHER PUBLICATIONS

R. Halir et al. Ultra-broadband nanophotonic beamsplitter using an anisotropic sub-wavelength metamaterial. Laser & Photonics Reviews, 10:6:1039-1046, Nov. 2016 (https://doi.org/10.1002/lpor.201600213) (Year: 2016).*

Internal Search Report for related patent application PCT/ES2021/070279 prepared by the Spanish Patent and Trademark Office and mailed Jun. 24, 2021, translation provided.

Written Opinion of the Internal Searching Authority for related patent application PCT/ES2021/070279 prepared by the Spanish Patent and Trademark Office and published Nov. 4, 2021 on WIPO Patentscope, translation provided.

Supplementary European Search Report in related patent application EP 21796940 prepared by the European Patent Office and dated Apr. 30, 2024, in English, 9 pgs.

Article "Bragg Filter Bandwidth Engineering in Subwavelength Grating Metamaterial Waveguides" by Pavel Cheben et al., published by Optics Society of America in journal Optics Letters vol. 44, No. 4, pp. 1043-1046, dated Feb. 15, 2019, in English, 4 pgs.

Article "Mode Sensitivity Analysis of Subwavelength Grating Slot Waveguides" by Mutasem Odeh et al., published by IEEE in IEEE Photonics Journal vol. 11, No. 5, Oct. 2019, in English, 11 pgs.

* cited by examiner

Fig. 1

Prior Art

Fig. 2

Prior Art

BRICKED SUB-WAVELENGTH PERIODIC WAVEGUIDE, MODAL ADAPTER, POWER DIVIDER AND POLARISATION SPLITTER THAT USE SAID WAVEGUIDE

CROSS-REFERENCE TO RELATED APPLICATIONS

This application is a national stage under 35 U.S.C. § 371 of PCT patent application PCT/ES2021/070279 filed on 27 Apr. 2021, which is pending and which is hereby incorporated by reference in its entirety for all purposes. PCT/ES2021/070279 claims priority to Spanish Patent Application P202030367 filed on 29 Apr. 2020, which is hereby incorporated by reference in its entirety for all purposes.

FIELD OF THE INVENTION

The invention is directed to the field of integrated optics, and more particularly to devices based on periodic waveguides with sub-wavelength structures.

More particularly, the invention is directed to a bricked sub-wavelength periodic waveguide, which preserves the properties that conventional waveguides have of controlling the value of the effective index of the modes they support, as well as their dependence on the wavelength, but which incorporates the possibility of also controlling their anisotropy.

The invention presents a great advantage, as it can operate with longer periods without departing from the sub-wavelength regime. That is to say, to undertake its manufacturing larger minimum feature sizes will be required, which facilitates its mass production with deep-UV techniques. Also, two other objects of the invention are two devices that make use of said new waveguide, a power divider and a polarization splitter.

BACKGROUND OF THE INVENTION

Photonics is the branch of science that studies the generation, manipulation and detection of light (photons). The electromagnetic spectrum that it covers is very broad. In increasing order of wavelength ($\lambda$), it covers the following bands: ultraviolet ($\lambda$: 0.01-0.38 µm), visible ($\lambda$: 0.38-0.78 µm), near infrared ($\lambda$: 0.78-2 µm), mid-infrared ($\lambda$: 2-50 µm) and far infrared ($\lambda$: 50-1000 µm). Like what happened with electronic integrated circuits, photonic integrated circuits, PIC, have the objective of integration of all the devices and functional blocks necessary for light processing on a single chip.

The photonic devices and circuits are built by combining materials with different refractive index. The performance and size of the manufactured devices depend on the contrast or difference of refractive index of the materials used. The Silicon on Insulator, SOI, platform is the platform that has prevailed in the near-infrared band, which, together with the visible, is the band where the greatest number of applications are being developed.

The SOI platform has several advantages. The first one is that the high contrast of refractive index between the silicon ($n_{Si}$=3.476) and the silicon dioxide ($n_{SiO2}$=1.44) used, respectively, as core and substrate/shell of the optical waveguides, makes it possible to reduce the cross-section of the interconnection guides or photonic wires, their radii of curvature (<5µ), and, in general, the size of the devices.

Figure 1:
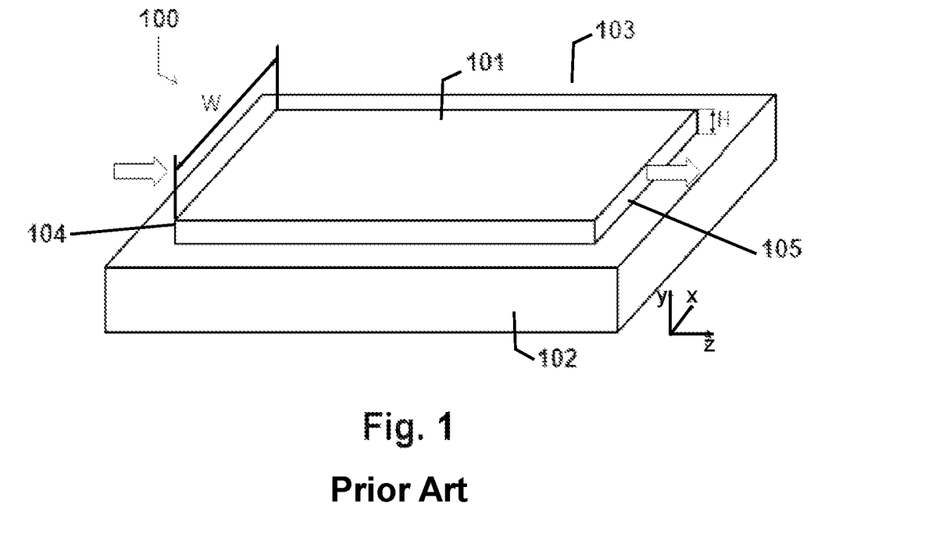
FIG. 1.—Shows a perspective view of a conventional waveguide of the prior art.

In FIG. 1 there is shown an example of a conventional waveguide (100), that comprises a core (101) of width W and thickness H. The core (101) is supported on a substrate (102) and is covered by air or other cover material (103) with a light wave entering through one end (104) and exiting through the opposite end (105).

The second great advantage of the SOI platform is that for the manufacturing of the photonic circuits, CMOS (Complementary Metal Oxide Semiconductor) manufacturing processes that have been used in the integrated electronic circuits, which are well established and mature, can continue being used.

Despite the advantages that SOI technology has brought to the field of integrated optics, the fact that it is a high-contrast technology brings with it several drawbacks. The most important of all is the difficulty of designing high-performance devices, mainly of large bandwidth.

To achieve high performance devices it is necessary to be able to synthesize both the desired value of the effective index (index engineering), and to control its dependence on the wavelength (dispersion engineering).

In conventional waveguides on the SOI platform, the difficulty is caused by the strong dependence that the effective index of the mode that propagates through the structure has with the electrical size of the guide. Due to the thickness H being fixed for manufacturing reasons, only the width W is available for controlling the value of the effective index. That causes that the conventional waveguide features, despite being made of isotropic materials, very different propagation characteristics for the Transverse Electrical (TE or in-plane) and Transverse Magnetic (TM or out-of-plane) polarizations, what is known as birefringence.

In certain applications, it is necessary to control the degree of birefringence, increasing it, for example, to design devices sensitive to the polarization, or decreasing it, for devices insensitive to polarization.

The appearance in the field of photonics of the sub-wavelength periodic dielectric waveguides, SWG, has been fundamental for considerably improving the performance of the devices. The high degree of maturity reached by SWG structures in the near-infrared band, their versatility, and above all the wide range of devices in which they have proven to be very useful, has made them nowadays an essential technology in the design of many devices.

Figure 2:
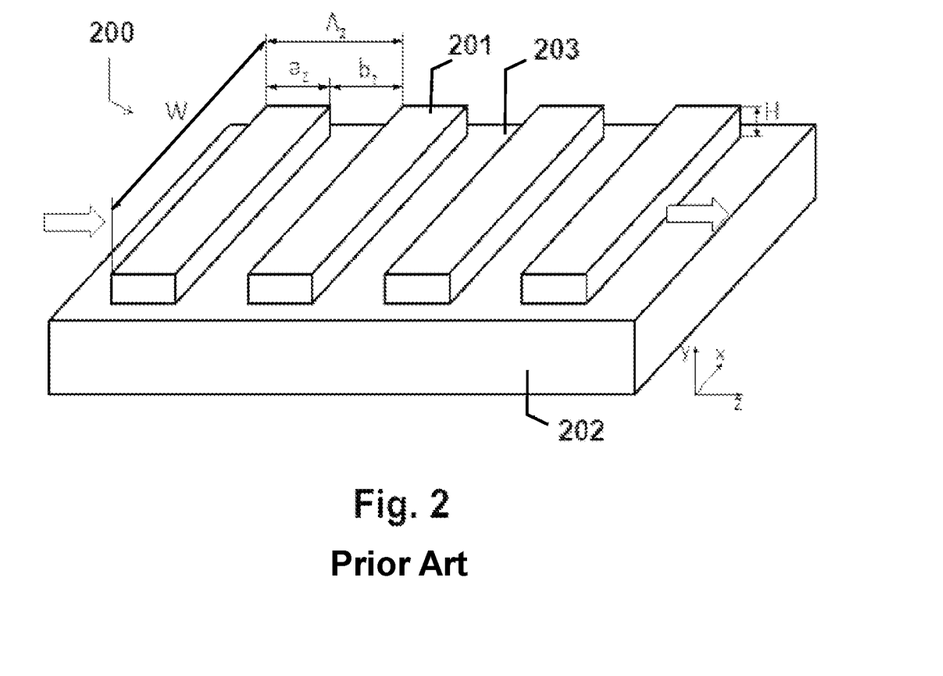
FIG. 2.—Shows a perspective view of a conventional SWG waveguide of the prior art.

For illustrative purposes, FIG. 2 shows the general geometry of a dielectric SWG waveguide (200) commonly used in integrated optics. It comprises bars (201) of width W, thickness H and length $a_z$, separated by a distance $b_z$. The bars (201) have a periodicity $\Lambda_z$, which must be equal to the sum of $a_z$ and $b_z$. The bars (201) are perpendicular to the propagation direction of the wave, indicated by an arrow in FIG. 2, in the direction of the z axis.

The bars (201) are supported on a substrate (202), whose refractive index is lower than the refractive index of the material used in the bars (201). The space between bars (201) is filled with a cover material (203), whose refractive index may be equal to that of the substrate (202), lower or even higher. What should never be is higher than the refractive index of the material used in the bars (201). The modes or electromagnetic solutions supported by the SWG waveguides (200) feature periodic field distributions and are called Floquet modes.

The operating regime of the SWG waveguides (200) is determined by two parameters, the period, indicated in FIG. 2 as $\Lambda_z$, and the Duty Cycle, DC, or fill factor that is equal to the quotient between the length $a_z$ and the period $\Lambda_z$ (DC=$a_z/\Lambda_z$). Depending on the quotient between the operating wavelength ($\lambda$) and the period ($\Lambda_z$), the SWG waveguides (200) have three different operating zones that are called radiation zone, Bragg zone and sub-wavelength or SWG zone.

Figure 3:
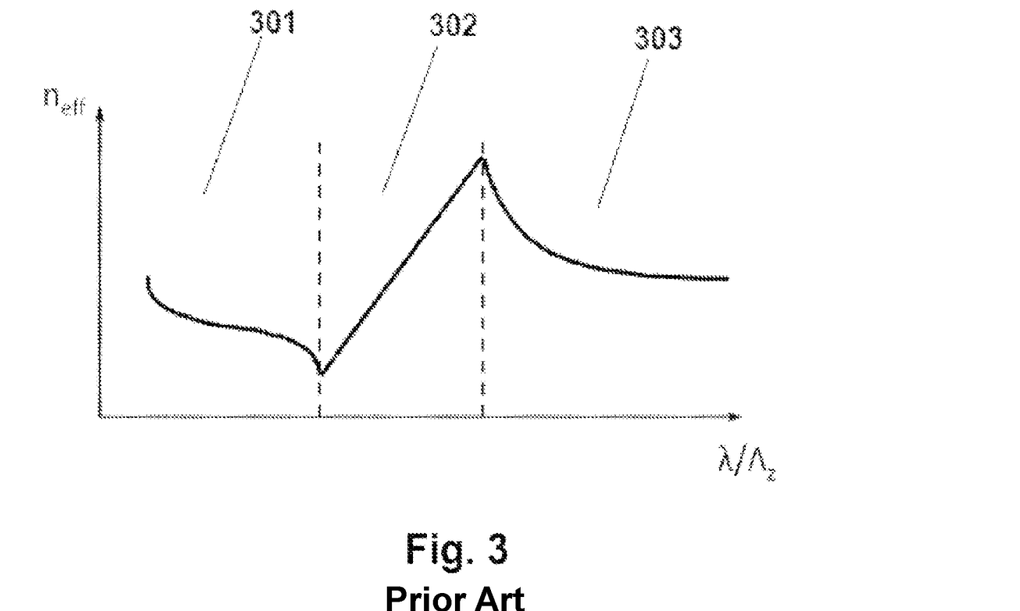
FIG. 3.—Shows a graph representing the variation of the effective index of a Floquet mode in a conventional SWG waveguide as a function of the quotient between the wavelength and the repetition period, as well as the three possible zones of operation.

In FIG. 3 there is shown, in an explanatory manner, how the effective index of the Floquet mode ($n_{eff}$) varies as a function of said quotient for a radiation zone (301), a Bragg zone (302) and a sub-wavelength zone (303), with $n_{eff}$ in the Bragg zone (302) being equal to $\lambda/2\Lambda_z$. For the SWG waveguides (200) to work in the sub-wavelength or SWG regime, it is necessary that the quotient between the operating wavelength ($\lambda$) and the period ($\Lambda_z$) is not less than two times the effective index of the mode, that is to say $\lambda/\Lambda_z > 2 \cdot n_{eff}$ must be fulfilled.

The fact that SWG waveguides (200) possess two new degrees of freedom, the duty cycle, DC, and the period, $\Lambda_z$, provides them with a great potential when designing devices. By varying the duty cycle, DC, it is possible to engineer the refractive index, that is to say, to control the value of the effective index of the mode in the range of wavelengths of interest ($\Delta\lambda$)

Figure 4:
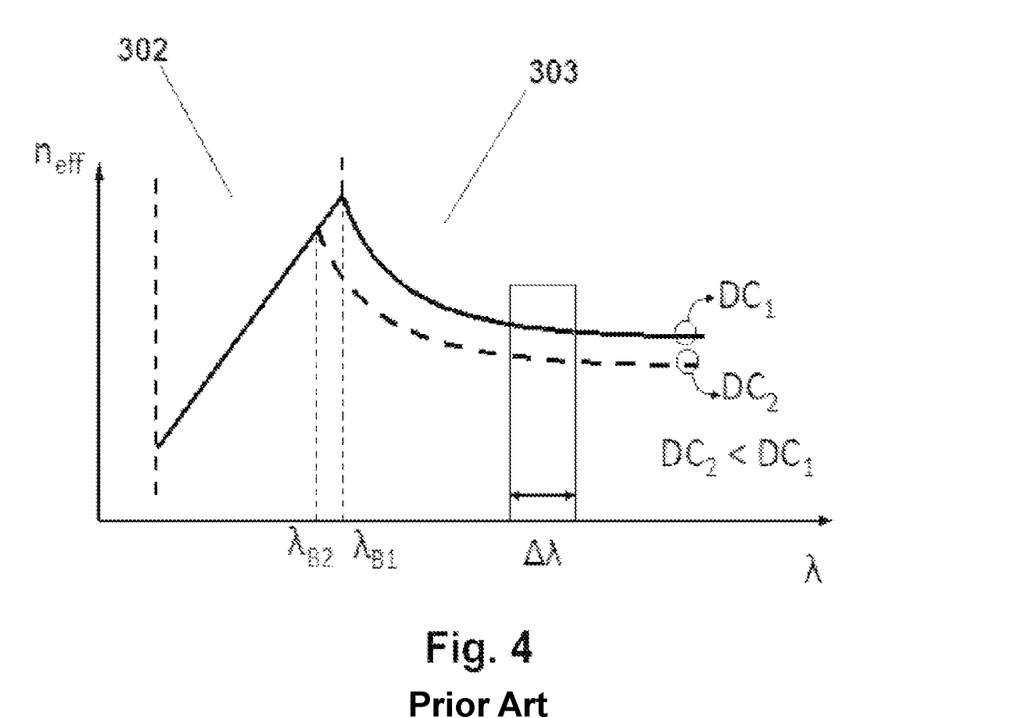
FIG. 4.—Shows how the curve of the effective index of a Floquet mode in a conventional SWG waveguide is modified as a function of the wavelength when the duty cycle is decreased.

In FIG. 4 there is shown, in an explanatory manner, the effect that the variation of the duty cycle of the SWG waveguide (200) from a $DC_1$ value to a lower $DC_2$ value has on the mode dispersion curve. On the other hand, by varying the period ($\Lambda_z$), it is possible to engineer the dispersion, that is to say, to control the wavelength dependence on the effective index of the mode in the range of wavelengths of interest ($\Delta\lambda$).

Figure 5:
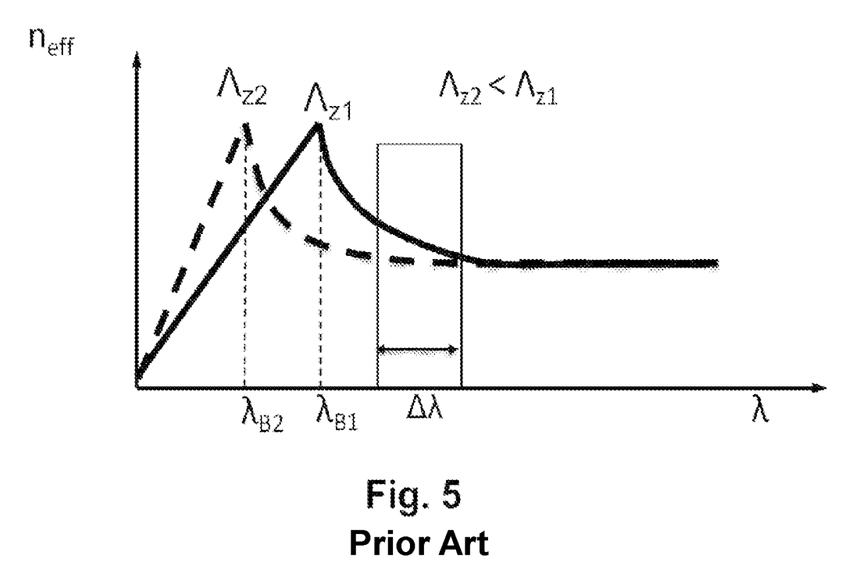
FIG. 5.—Shows how the curve of effective index of a Floquet mode in a conventional SWG waveguide is modified as a function of the wavelength when the repetition period is decreased.

In FIG. 5 there is shown, in an explanatory manner, the effect that the decrease in the period from a value $\Lambda_{z1}$ to a lower value $\Lambda_{z2}$ has on the dispersion curve. In relation to the present invention, it is important to realize that varying the duty cycle (from $DC_1$ to $DC_2$) or the period (from $\Lambda_{z1}$ to $\Lambda_{z2}$) to do, respectively, rate engineering or dispersion engineering, affects the wavelength value at which the Bragg zone starts. In both cases, the wavelengths where the Bragg zone starts have been shifted from $\lambda_{B1}$ to $\lambda_{B2}$.

In document P201830653 there is presented a new potentiality of the SWG waveguides (200). If the bars (201) in FIG. 2 that make up the SWG waveguide (200) are rotated a certain angle with respect to the propagation direction, according to the z axis in the figure, it is possible to independently control the effective indices of the transverse electric (TE) and transverse magnetic (TM) modes, that is to say, it is possible to do birefringence engineering. The document demonstrates how the tensor matrix that characterizes the anisotropy of an SWG waveguide (200) is modified as a function of the turning angle.

An important aspect to be highlighted of what is presented in document P201830653, which differentiates it from the solution proposed in this invention, is that as the turning angle increases, the period of the structure in the propagation direction also increases by a factor $1/\cos(\alpha)$, a being the turning angle. That is to say, the capability of controlling the anisotropy is coupled with the size of the period, so both parameters cannot be chosen independent of each other.

The capability of the SWG waveguides (200) of controlling the electromagnetic properties of the mode are achieved without the need to use multiple etch depths or to incorporate additional materials. Therefore, devices that make use of SWG waveguides (200) can be integrated on the same photonic chip with devices that make use of conventional waveguides (100), and all be fabricated during the same etching step.

Despite the enormous benefits of using SWG technology at optical frequencies, its fabrication is still its main limitation. In order to be capable of operating in the SWG operating zone and not entering in the Bragg zone, it is necessary that the periods meet the condition $\Lambda_z < \lambda/(2 \cdot n_{eff})$. Operating in the near infrared ($\lambda = 1.55$ μm) and on the SOI platform ($n_{eff}$ between 2 and 2.5), that means that the periods ($\Lambda_z$) must be at most of the order of the 300 or 350 nm.

If it is also desired to operate far from the Bragg zone, or deep-SWG zone ($\lambda_z << \lambda/(2 \cdot n_{eff})$), the required periods are even more restrictive, of the order of the 100 nm. That implies that, if the duty cycle is 50%, the bars (201) of silicon must have lengths in the propagation direction between 150 nm, if operating near the Bragg zone to do dispersion engineering, and 50 nm, if operating far from the Bragg zone to do refractive index engineering.

For the mass production of photonic circuits, and the resulting cost reduction, the fabrication technology usually used is the DUV-193 (Deep Ultra Violet 193 nm). The minimum feature sizes, MFS, that the DUV-193 is capable of achieving is greater than the 100 nm. Therefore, the larger the MFS that our circuits and applications required, compared to that that the manufacturing technology can guarantee us, the higher the yields will be.

That is why, the vast majority of photonic devices that have been proposed and that make use of SWG waveguides (200) have not yet been exploited from a commercial point of view, their experimental validation being limited to the field of research, where the microelectronics etching technique of electron beam exposure, e-beam, whose MFS can reach up to the 50 nm, is usually used.

In conclusion, in the field of integrated optics there exists the need for waveguides that can continue to take advantage of all the advantages that SWG waveguides (200) offer from the point of view of design of devices (index, dispersion and anisotropy engineering), but that from the point of view of their manufacturing require higher MFS, and therefore less demanding, to facilitate their commercial exploitation.

DESCRIPTION OF THE INVENTION

The present invention solves the problems raised above, and for that it is proposed, as first object of invention, a sub-wavelength, SWG, periodic waveguide, which owing to its structural characteristics will be called "bricked".

The advantages that the new periodic waveguide features are the following. Firstly, it keeps all the properties of conventional SWG waveguides of controlling the electromagnetic properties of the modes (index engineering and dispersion engineering), and also incorporates the possibility of controlling the anisotropy, and therefore, also the resulting birefringence. Unlike other solutions discussed in the background section, the anisotropy control does not affect the period ($\Lambda_z$) in the propagation direction.

The second advantage they feature, derived from the previous one, is that it is capable of operating with higher periods ($\Lambda_z$), without this meaning leaving the SWG regime and entering the Bragg operation mode. This means that it will be possible to increase the minimum feature sizes or required for its manufacturing, which will facilitate its mass production by means of DUV, Deep-UltraViolet, lithographic techniques.

The bricked sub-wavelength periodic guide, first object of the invention, does not need to incorporate new materials or increase the number of etching steps, so it could be integrated with conventional photonic wires, with conventional SWG waveguides, or with devices that make use of the same, on a same chip and be fabricated all during the same etching step.

In the following, the four objects of invention, which all make use of the periodic waveguide, first object of the invention, will be described:

- a first object of invention, as it has been indicated, is a bricked sub-wavelength periodic waveguide, which supports the two fundamental modes of each one of the polarizations (TE and TM),
- a second object of invention is a modal adapter, that is to say a transition between conventional photonic guides or wires and the periodic waveguide, first object of invention, and vice versa, from the periodic waveguide to conventional waveguides,
- a third object of invention is a power divider, preferably of 3 dB-90°, that makes use of the periodic waveguides, first object of invention, and
- a fourth object of invention, which is a polarization splitter of the TE0 and TM0 modes and that makes use of the bricked sub-wavelength periodic waveguides.

Next, each one of them is described in detail.

The first object of invention, the periodic waveguide, comprises a substrate, on which are periodically arranged, in a direction perpendicular to the wave propagation direction, with a period $\Lambda_z$, bars of core material of length $a_z$ and height H. Between bar and bar are arranged some gaps of a cover material, which can be air or any other material.

The period ($\Lambda_z$) to be chosen in the wave propagation direction can be larger than that resulting from applying the condition $\Lambda_z < \lambda/(2 \cdot n_{eff})$ in a conventional periodic waveguide, and yet still be in the sub-wavelength operating regime.

To this end, the periodic waveguide object of the invention has two fundamental features. The first consists in that the bars of core material are divided into first blocks of width '$a_x$' and second blocks of width '$b_x$'.

These blocks of different widths alternate in the direction transverse to that of the wave propagation (x direction), such that a block of width '$a_x$', a block of width '$b_x$', a block of width '$a_x$', and so on are arranged.

The second feature is that all second blocks of length '$b_x$' are shifted a distance '$d_z$' in the propagation direction (z direction), with respect to the first blocks of width '$a_x$'.

The effect of the shift '$d_z$' of the second blocks is that in the dispersion curves of the effective index it is different for the TE modes than for the TM modes. For the TE modes, the shift '$d_z$' can annul the effect of the increase in the period $\Lambda_z$. That is to say, if in SWG waveguides the increase of the period $\Lambda_z$ produces an increase of the value of the effective index and an increase of its dependence on the wavelength, by making the shift '$d_z$' to the second blocks of width '$b_x$', the dispersion curves of the TE mode undergoes the opposite effect, that is to say, they decrease their value of effective index and also flatten with the wavelength.

The decrease of the effective index is what favors that period sizes $\Lambda_z$ that in SWG waveguides would imply that certain wavelengths of interest are to be operating in Bragg zone, by not fulfilling the relationship $\Lambda_z < \lambda/(2 \cdot n_{eff})$, are then to operate in sub-wavelength zone in periodic waveguides of bricked aspect, such as those of the present invention, by fulfilling it.

On the other hand, the dispersion curves of the TM modes are hardly affected by the shift '$d_z$' of the second blocks of width '$b_x$'. This very different behavior for the TE and TM polarizations provides the periodic waveguides with bricked aspect, of an enormous potentiality for controlling the birefringence and for designing polarization-selective devices, such as polarization splitters.

In conclusion, the great advantage that the bricked periodic waveguides of the present invention have is that they are capable of operating with periods $\Lambda_z$ greater than those used by conventional SWG waveguides, while maintaining intact their capability of control over the effective rate of the modes, that is:

- capability of controlling the value of the effective index (index engineering),
- capability of controlling its dependence in respect of wavelength (dispersion engineering), and
- capability of controlling its selective behavior with polarization (birefringence engineering).

Also preferably, depending on the particular embodiment, the geometrical parameters of the periodic waveguide, such as width (W), periods ($\Lambda_z$ and $\Lambda_x$), duty cycle (DC) and shift ($d_z$) can either remain constant along the entire periodic waveguide, or be modified gradually or abruptly along the waveguide, thus obtaining different properties at different positions of the guide.

The bricked sub-wavelength periodic waveguide is preferably implemented in silicon on insulator, SOI, with a cover material that preferably can be selected between air, silicon dioxide, and a polymer. More preferably, in the case of using a polymer as a cover material, said polymer is selected so as to feature a variation of the refractive index with temperature of opposite sign to the variation of the silicon. That is to say, upon application of a temperature change, the modification in the refractive indices of the blocks of core material and cover material feature opposite signs, thus mitigating the variability of the response of the periodic waveguide to environmental changes.

A second object of the present invention is a modal adapter for transition between conventional waveguides and the bricked sub-wavelength periodic waveguides, and vice versa. The modal adapter has the function of minimizing the insertion losses between both types of waveguides. The modal adapters comprise two zones. A first zone, to convert a conventional waveguide of a certain width into an SWG waveguide of the same width.

To that end, the core of the conventional waveguide is chopped into pieces of length '$\Lambda_z$', that coincides with the period of the SWG guide that is sought to be converted into. Each of said pieces, is in turn divided into two parts, of respective length '$a_z$' and '$b_z$', that coincide with the lengths of the bars and gaps of the SWG guide that is sought to be converted into. Along the first zone of the modal adapter, the width of the pieces of length '$b_z$' progressively decreases until it disappears. The second zone of the modal adapter, to convert the waveguide SWG resulting from the first zone into the desired bricked sub-wavelength periodic waveguide (first object of the invention). To that end, preferably, the modal adapters vary period by period and in a gradual manner the shift '$d_z$', while the width of the periodic waveguide increases until achieving the desired final values of width and shift.

A third aspect of the invention is a power divider, preferably of 3 dB-90°, that makes use of the bricked sub-wavelength periodic waveguides, first object of invention. The divider, also called a coupler, is designed to preferably operate with TE polarization, due to this polarization being the one that benefits most from using the periodic waveguides. The power divider comprises a Multimode Interference Device, MMI, which is based on the principle of self-imaging or spatial Talbot effect.

The power divider, preferably implemented on SOI, comprises at least one input waveguide, which receives a transverse electric (TE) mode, preferably the fundamental mode, and two output waveguides in which the input mode appears with half power each and a phase shift of 90° between them. All the input and output guides of the power divider are formed by conventional waveguides. The central part of the coupler is a bricked sub-wavelength periodic waveguide, wide enough to support several Floquet modes. The access to the periodic waveguide occurs through one or two input ports, formed by access periodic waveguides.

Modal adapters, described in the second aspect of the invention, are positioned between the periodic waves and the input and output guides to the power divider. The design of the MMI based on periodic waveguides is performed in a similar way as the design of an MMI made with conventional homogeneous waveguides, or an MMI with conventional SWG guides. Next, the main steps are summarized:

Determining the widths and spacing of the access periodic waveguides with which the central part of the power divider, that is the MMI, is to be accessed. In principle, the wider the access periodic waveguides and the closer they are placed the better. The access periodic waveguides should be completely decoupled over the typical length span of the modal adapters.

Choosing a first width of the central periodic waveguide approximately equal to the sum of the widths of the access periodic waveguides and two times the separation distance between them.

Varying the period, $\Lambda z$, and the shift, dz, that maximizes the MFS and achieves a beat length response of the first two modes of the MMI as flat as possible over the range of wavelengths of interest.

Determining the optimum length of the MMI so that the measured excess losses in the output waveguides feature a minimum, compatible with an also small unbalance and a phase shift between the output waveguides as close as possible to 90°.

Repeating the previous point for different widths until a good compromise between insertion losses, unbalance and phase shift error is found.

Designing modal adapters between the conventional waveguides of the input/output waveguides and the MMI input access periodic waveguides.

Simulating the cascaded input and output modal adapters (in back-to-back configuration) and checking their correct operation by calculating their S-parameters over the range of wavelengths of interest.

Incorporating the modal adapters at the input and output of the MMI and checking by photonic simulation that the operation of the whole device is as expected.

The use of periodic waveguides such as those of the first object of invention as the central part of the MMI makes it possible to achieve a device of enormous bandwidth, similar to that achieved by MMIs based on conventional SWG waveguides, but with a larger $\Lambda_z$ period.

The fourth aspect of the invention is a polarization splitter that employs the properties of bricked sub-wavelength periodic waveguides, to achieve a compact polarization splitter, of large bandwidth, with low losses, good inter-polarization rejection, manufacturable in a single etching step and with an MFS compatible with the Deep-UV mass manufacturing technique. The polarization splitter is based on a multimode interference coupler, MMI, in the central part of which a wide multimode guide of the type described in the first object of invention (periodic waveguide) is used.

The polarization splitter, preferably implemented on SOI, comprises at least one input waveguide that receives a transverse electric (TE) mode and a transverse magnetic (TM) mode, and two output waveguides that separately transmit said modes. All input and output waveguides to the polarization splitter are formed by conventional waveguides.

The central part of the polarization splitter is a bricked sub-wavelength periodic waveguide, wide enough to support several Floquet modes. The access to the central periodic waveguide is provided by one or two input waveguides, formed by periodic waveguides. Between these and the input and output waveguides to the polarization splitter, respective modal adapters are arranged.

By controlling the anisotropic properties of the structures of the periodic waveguides through the shift '$d_z$' it is possible to generate a direct Talbot self-image of the transverse electric (TE) mode at a first distance ($L_{TE}$) corresponding to an even multiple of three times of a beat length of said TE mode ($L_{\pi TE}$); and an inverse Talbot self-image of the transverse magnetic (TM) mode at a second distance ($L_{TM}$), corresponding to an odd multiple of three times of a beat length of said TM mode ($L_{\pi TM}$).

It is to be noted that direct Talbot self-imaging is understood as that position where the modes propagated by the multimode interference region constructively interfere at a maximum aligned with the input waveguide. Equivalently, in the inverse Talbot self-image, the multimode interference results in a maximum that is shifted transversely with respect to the input waveguide.

Selecting the geometrical parameters of the bricked sub-wavelength periodic waveguide structure by means of optimization by photonic simulation, the quotient between the beat length of the TM mode ($L_{\pi TM}$) and the beat length of the TE mode ($L_{\pi TE}$) is set to be a quotient of even and odd integers, respectively. Preferably, to have a device length that is as small as possible, let one be twice the other. With the aim of optimizing the focusing of the self-images of the TE and TM modes in the first output waveguide (direct image) and the second output waveguide (inverse image) respectively, the total length of the MMI is three times larger than $L_{\pi TM}$ and six times larger than $L_{\pi TE}$.

It is to be noted that the anisotropy control provided by the longitudinal shift '$d_z$' or 'bricked' effect, increases the degree of freedom when selecting the proportionality factor between the focusing distances of the self-images of the TE and TM modes, resulting in a more compact and lower loss polarization splitter than those MMIs in which there is no such possibility, such as MMIs made with conventional homogeneous waveguides.

Also, it is to be noted that, although other parameters of the SWG waveguides such as the period or the duty cycle can affect the resulting anisotropy, said effect is significantly less than that produced by the 'brick' effect, thus limiting the performance obtainable by the polarization splitter.

DESCRIPTION OF THE FIGURES

With the aim of helping for a better understanding of the features of the invention in accordance with a preferred example of a practical embodiment thereof, and to complement this description, the following figures, which are illustrative and not limiting, are included as an integral part of this description.

PREFERABLE EMBODIMENT OF THE INVENTION

Next is described, with the aid of FIGS. 1 to 15, a preferred embodiment of the present invention.

Figure 6:
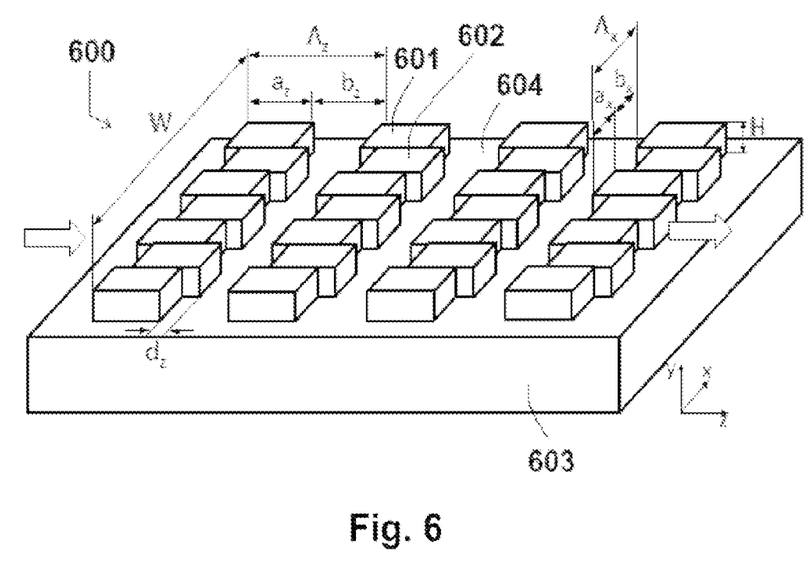
FIG. 6.—Schematically shows, a bricked sub-wavelength periodic waveguide, in accordance with a preferred embodiment of the invention.

FIG. 6 shows in schematic form a perspective view of a preferred realization of a bricked sub-wavelength periodic waveguide (600), preferably single-mode, that allows keeping all the control properties that conventional SWG waveguides (200) have (control of the effective index, of their dispersion, and of their birefringence), as that shown in FIG. 2, but operating with periods ($\Lambda_z$) in the propagation direction that may be larger, and therefore, more feasible to manufacture. FIG. 6 shows the main geometrical parameters of the periodic waveguide (600) object of the invention.

The bricked sub-wavelength periodic waveguide (600) comprises a substrate (603), on which are arranged a series of blocks (601, 602) periodically distributed in a direction perpendicular to that of the propagation of the wave entering through the periodic waveguide (600). This transverse direction is represented as x direction in FIG. 6.

The bricked sub-wavelength periodic waveguide (600) is formed by a structure that features two types of periodicities, one in the transverse direction (x) and another one in the longitudinal (z) or propagation direction.

The periodicity in the transverse direction, indicated as '$\Lambda_x$' in FIG. 6, is obtained by combining blocks (601, 602) of core material having the same length '$a_z$', but different width, '$a_x$' and '$b_x$', first blocks (601) of width '$a_x$' and second blocks (602) of width '$b_x$'.

The blocks (601 and 602) can have a relative shift between them in longitudinal direction '$d_z$', which is what gives them different properties from those of conventional SWG waveguides (200) with relative shift between them equal to zero ($d_z=0$).

The periodicity in the propagation direction '$\Lambda_z$' is achieved by alternating blocks (601, 602) of length '$a_z$' with gaps (604) of cover material of length 'b'. The sections of the blocks (601, 602) of core material of the periodic waveguide (600) have a width 'W' and a height 'H' and are supported on the support material or substrate (603) acting as an insulator.

The period in longitudinal direction '$\Lambda_z$' must fulfill the condition of not being in Bragg, that is to say, $\Lambda_z < \lambda/(2 \cdot n_{eff})$. Since there are two periods ($\Lambda_z$ and $\Lambda_x$) two duty cycles are usually defined.

The first $DC_z$ for defining the ratio of each block (601, 602) of silicon '$a_z$' in relation to the longitudinal period $\Lambda_z$. The second $DC_x$ for defining the ratio of each block (601, 602) of silicon that is not shifted '$a_x$' in relation to the transverse period $\Lambda_x$.

The particular values of all geometrical parameters are defined prior to the manufacturing of the periodic waveguide (600) by numerical simulations as described above.

In particular, the periodic waveguide (600) is preferably modeled as an equivalent guide with a core whose refractive index is a diagonal tensor ($\tilde{n}$) in accordance with the following expression:

$$\tilde{n} = \begin{bmatrix} \tilde{n}_{xx}(d_z) & 0 & 0 \\ 0 & \tilde{n}_{yy} & 0 \\ 0 & 0 & \tilde{n}_{zz}(d_z) \end{bmatrix}$$

where:

$$\tilde{n}_{xx}(d_z) = \frac{1}{2}\left(n_{xx} + \sqrt{n_{xx} \cdot n_{zz}}\right) + \frac{1}{2}\left(n_{xx} - \sqrt{n_{xx} \cdot n_{zz}}\right) \cdot \cos\left(2\pi \frac{d_z}{\Lambda_z}\right)$$

$$\tilde{n}_{yy} = n_{yy}$$

$$\tilde{n}_{zz}(d_z) = \frac{n_{xx} \cdot n_{zz}}{\tilde{n}_{xx}(d_z)}$$

[$n_{xx}$, $n_{yy}$, $n_{zz}$] being the components of a diagonal tensor (n) of the equivalent homogeneous anisotropic medium of a conventional SWG structure (200), that is to say, without relative shift of blocks in longitudinal direction ($d_z=0$). This modeling can either provide a final shift value ($d_z$), or serve as a first approximation, further refined in a second computational step by means of a full simulation of the structure (that is to say, without approximations of SWG structures as homogeneous media).

Alternatively, an alternative realization of the invention, the period '$\Lambda_z$' fulfills that $\Lambda_z \geq \lambda/(2 \cdot n_{eff})$, where $\lambda$ is the wavelength of the wave that propagates through the periodic waveguide (600) and $n_{eff}$ is the effective index of the mode. Therefore, the periodic waveguide (600) would operate in a regime other than sub-wavelength, that is to say, operating in radiation mode or distributed reflector mode.

Figure 7:
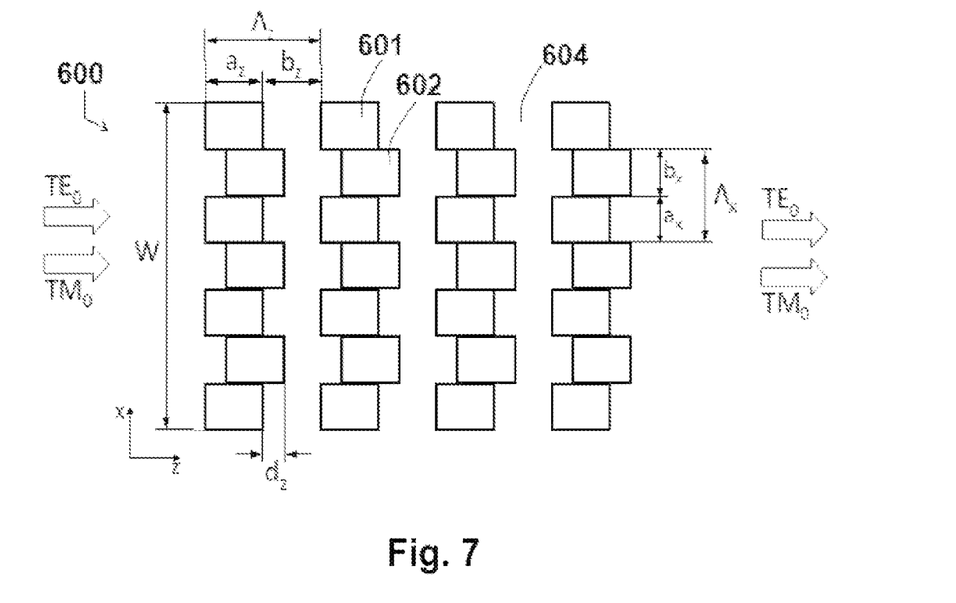
FIG. 7.—Schematically shows, in a top view, a bricked sub-wavelength periodic waveguide, in accordance with a preferred embodiment of the invention.

FIG. 7 schematically shows, but with a top view now, a preferred embodiment of a bricked sub-wavelength periodic waveguide (600), preferably single-mode.

Figure 8:
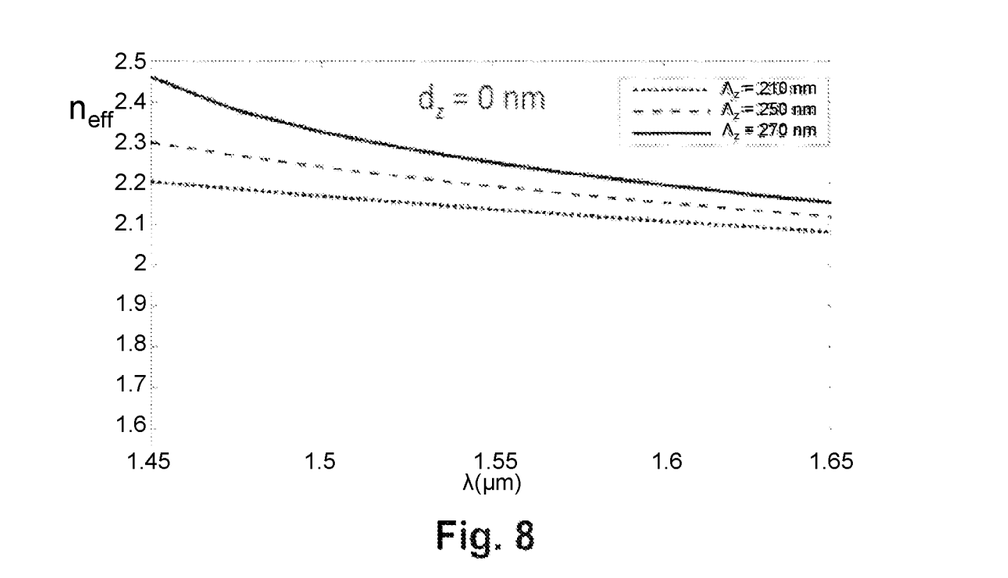
FIG. 8.—Shows a graph showing the effective index of the zero-order transverse electric ($TE_0$) Floquet mode as a function of the wavelength of a bricked sub-wavelength periodic waveguide, for different values of the period ($\Lambda_z$) and with a longitudinal shift ($d_z$) equal to zero, in accordance with a preferred embodiment of the invention.

To illustrate the potentiality of the invention, in FIG. 8 there is first shown how the effective index of the fundamental Floquet mode with TE polarization of a conventional SWG waveguide (200) is modified when the period $\Lambda_z$ is increased. In said preferred embodiment, the following materials have been used: the blocks (601, 602) of silicon core material, the substrate (603) of silicon dioxide, and the cover material (604), positioned between the blocks (601, 602), of silicon dioxide. The refractive indices at the free-space wavelength of 1.55 µm are: $n_{Si}$=3.476 and $n_{SiO2}$=1.444. The width W and thickness H were 3.3 µm and 0.22 µm, respectively.

As it can be seen in FIG. 8, upon increasing the size of the period, the curves of effective index shift towards larger effective indices and at the same time increase their negative slope.

Figure 9:
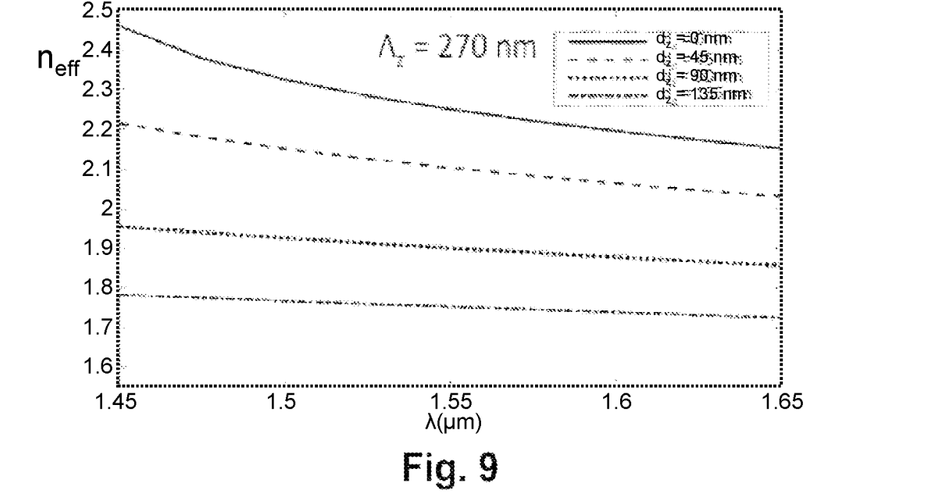
FIG. 9.—Shows a graph showing the effective index of the zero-order transverse electric ($TE_0$) Floquet mode as a function of the wavelength of a bricked sub-wavelength periodic waveguide, for different values of the longitudinal shift ($d_z$), in accordance with a preferred embodiment of the invention.

In FIG. 9, there is demonstrated how the introduction of some shift '$d_z$' to the case of large $\Lambda_z$ periods allows to recompose the initial situation that was present with small $\Lambda_z$ periods, that is to say, the effective index of the Floquet mode $TE_0$ decreases again in value and its dependence on the wavelength becomes flatter again.

Figure 10:
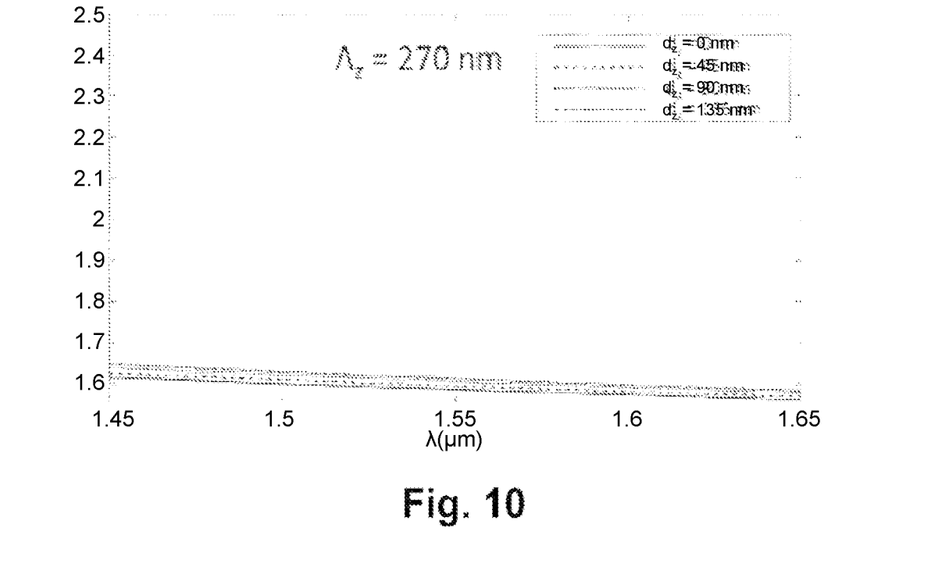
FIG. 10.—Shows a graph showing the effective index of the zero-order transverse magnetic ($TM_0$) Floquet mode as a function of the wavelength of a bricked sub-wavelength periodic waveguide, for different values of the longitudinal shift ($d_z$), in accordance with a preferred embodiment of the invention.

In FIG. 10, on the other hand, there is shown how the effective index of the Floquet mode $TM_0$ varies for various values of the shift '$d_z$'. It can be seen that now the effective index of the $TM_0$ mode is hardly affected.

Figure 11:
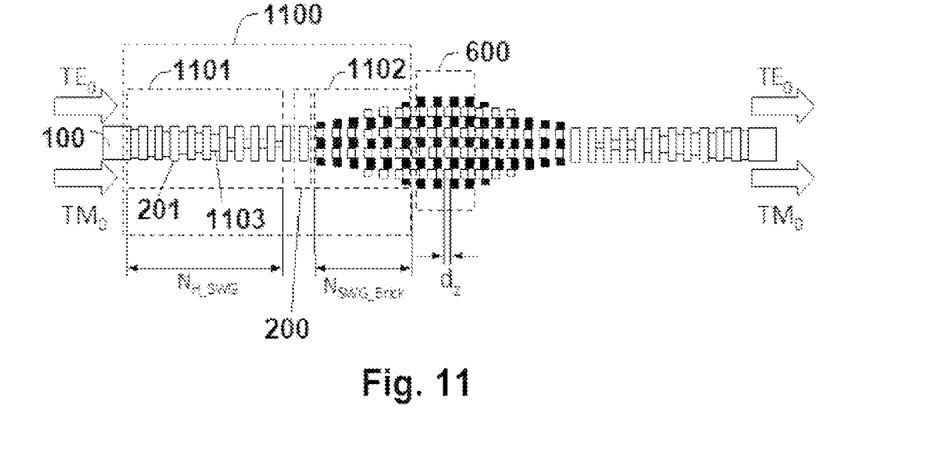
FIG. 11.—Shows a modal adapter between a conventional waveguide and a bricked sub-wavelength periodic waveguide, and vice versa, in accordance with a preferred embodiment of the invention.

In FIG. 11 there is shown a preferred embodiment of a modal adapter (1100) corresponding to the second aspect of the invention. The objective of the modal adapter (1100) or transition is to minimize the insertion losses between conventional waveguides (100) and periodic waveguides (600) of bricked aspect, that form part of a device making use of the same. The modal adapters (1100) must function correctly for the two TE and TM polarizations. In FIG. 6 there is represented the blocks (601, 602) in two different colors, for better understanding of the figure, but it should be noted that they are blocks (601, 602) of the same material. The same is true for the blocks (601, 602) depicted in FIGS. 12 and 15.

The modal adapter (1100) comprises two zones. A first zone (1101), for converting a conventional waveguide (100) of a certain width into another SWG waveguide (200) of the same width and with a period in longitudinal direction equal to the desired end period '$\Lambda_z$'. For this purpose, the central bridge (1103) between the bars (201) of core material progressively decreases in width until it disappears. A second zone (1102), serves to convert the SWG waveguide (200) resulting from the first zone into the periodic waveguide (600) of desired bricked appearance.

In the second zone (1102), the shift '$d_z$' is varied from an initial value equal to zero to the desired final value. In the second zone (1102), as the shift '$d_z$' is increased, the width of the guide is also gradually increased until achieving the desired width value. The reason for making in the first zone (1102) only the change from conventional homogeneous waveguide (100) to an SWG waveguide (200) of the same width, and not including in the first zone the change also between desired widths, is because the conventional waveguide (100) could enter into the Bragg zone in the first zone.

If the increase in width is done at the same time as the shift '$d_z$', we avoid this danger because as we move the Bragg away the width can be increased. It is to be noted that the specific geometry of the modal adapter (1100) can be varied as long as a progressive, smooth modal transition is guaranteed and entering in Bragg is avoided, as this would greatly increase the reflection losses.

Figure 12:
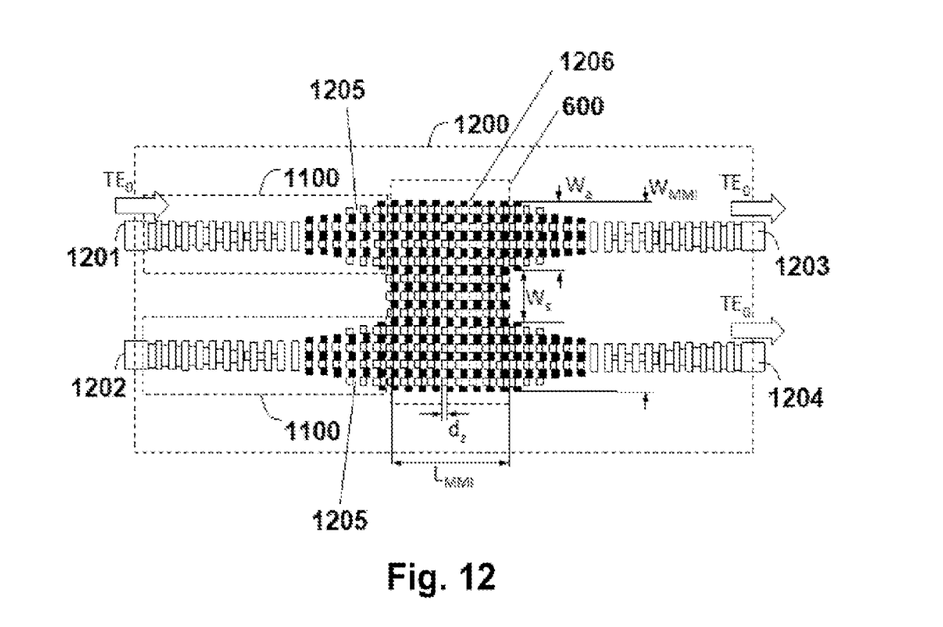
FIG. 12.—Shows a multi-mode interference coupler based on bricked sub-wavelength periodic waveguides operating as 3 dB/90° power divider, in accordance with a preferred embodiment of the invention.

In FIG. 12 there is shown a preferred embodiment of a 3 dB/90° power divider (1200) corresponding to the third aspect of the invention. It comprises two input guides (1201 and 1202) and two output guides (1203 and 1204), all of them conventional waveguides (100), that are connected to a multimode interference device (1206) through respective modal adapters (1100), such as those in FIG. 11. The modal adapters (1100) comprise a wide guide of the bricked sub-wavelength periodic waveguide (600) type.

Arranged between both modal adapters (1100), output and input ones, the modal interference device (1206) comprising a central periodic waveguide (600) with width $W_{MMI}$ and length LMMI is arranged. The modal adapters (1100), which are arranged between the input waveguides (1201 and 1202) and the periodic waveguide (600), and between this one and the output waveguides (1203 and 1204), are as described in the second aspect of invention, and transform the field profiles of the input/output waveguides (1201, 1202, 1203, 1204) to the field profiles of the periodic waveguide (600) of the MMI.

Compared to a 2×2 MMI realized exclusively with conventional waveguides (100), the described power divider (1200) achieves a smaller and more compact size and to considerably increase the bandwidth. Compared to an MMI realized with conventional SWG waveguides (200), the power divider (1200) achieves the same performance characteristics (insertion losses, unbalance and phase error over a large bandwidth) but with a considerably larger minimum feature size (MFS), on the order of 50% larger By first fixing the thickness of the blocks (601, 602) of silicon core material at H=220 nm, the width ($W_a$) and spacing ($W_s$) of the periodic waveguides (600) of access to the central part of the power divider (1200), that is to say, to the MMI (1206), are determined by photonic simulation. It was decided to choose $W_a$=1200 nm and $W_s$=800 nm. Next, a first width of the central periodic waveguide (600) ($W_{MMI}$) of the MMI is chosen, approximately equal to two times the sum of the widths of the access periodic waveguides (1205) to the central access part ($W_a$) and the separation distance between them ($W_s$), that is to say $W_{MMI}$=2 ($W_a$+$W_s$).

The next step is to determine, making use of photonic simulations, the period ($\Lambda_z$) and shift ($d_z$) that maximize the MFS and at the same time achieve a beat length of the first two modes of the MMI (1206) as flat as possible in the range of wavelengths of interest. For a 50% duty cycle ($a_z$=$b_z$), in FIG. 13 there is shown an example of how the beat length of the first two modes (the $TE_0$ and $TE_1$) varies with wavelength for several values of shift '$d_z$' and with a longitudinal period '$\Lambda_z$=250 nm'.

Figure 13:
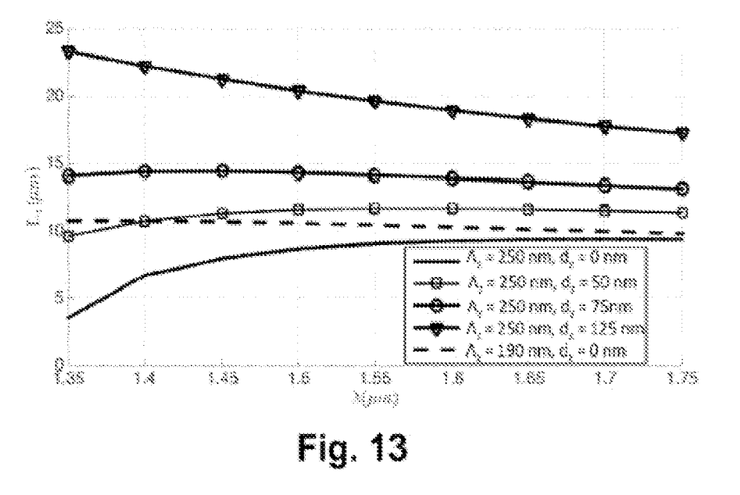
FIG. 13.—Shows a graph showing the beat length as a function of the wavelength of the first two transverse electric ($TE_0$ and $TE_1$) Floquet modes of a bricked sub-wavelength periodic waveguide, for different values of the longitudinal shift ($d_z$), in accordance with a preferred embodiment of the invention.

The transverse period 'x' was chosen for simplicity equal to the longitudinal '$\Lambda_z$'. It is to be noted that the case of zero shift ($d_z$=0) corresponds to the conventional SWG waveguide case (200). As it can be seen from the curves, the zero-shift case ($d_z=0$) features a poor behavior in the range of smaller wavelengths, as a consequence of being very close to the Bragg.

In order to achieve a flat behavior in wavelength for the zero-shift case, it is necessary to use significantly smaller longitudinal periods ('$\Lambda_z=190$ nm'), as also shown in FIG. 13. In order to use larger periods such as the indicated one of 250 nm, it is necessary to progressively increase the shift '$d_z$'. That will achieve the flattening of the curves and select that combination of values that gives the desired result in the range of wavelengths of interest.

Once the longitudinal period '$\Lambda_z$' and shift '$d_z$' with which the power divider (1200) will operate have been set, the rest of the parameters can be determined by successive photonic simulations, as well as making small readjustments to those already preset.

Figure 14:
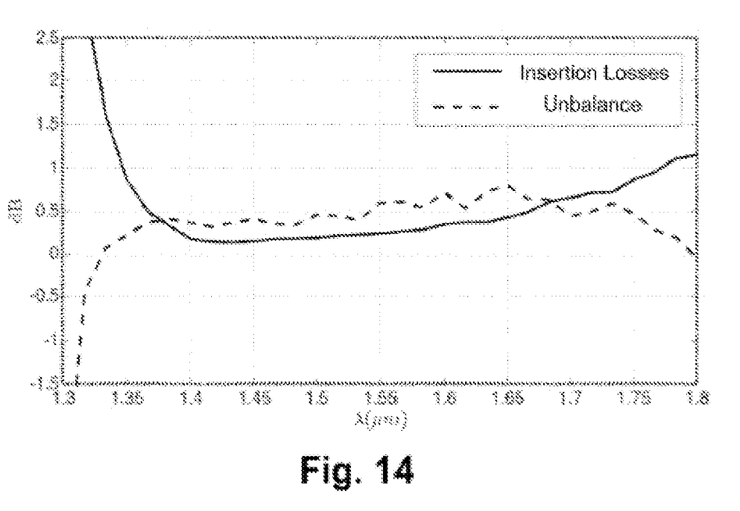
FIG. 14.—Shows a graph showing the performance (insertion losses and unbalance) of the 3 dB/90° power divider made with bricked sub-wavelength periodic waveguides, in accordance with a preferred embodiment of the invention.

FIG. 14 shows the response in wavelength that is obtained in simulation of the preferred realization of the power divider (1200) 3 dB/90°, corresponding to the third aspect of the invention. Specifically, two figures of merit are represented, the insertion losses, defined as the quotient between the power that appears in the output guides (1203 and 1204) in the fundamental mode $TE_0$, with respect to the power that enters the input guide (1201); and the unbalance, defined as the quotient between the powers that appear in the output guides (1203 and 1204). As it can be seen in said figure, the power divider (1200) designed achieves insertion losses and an unbalance lower than 1 dB in a bandwidth close to the 400 nm.

Figure 15:
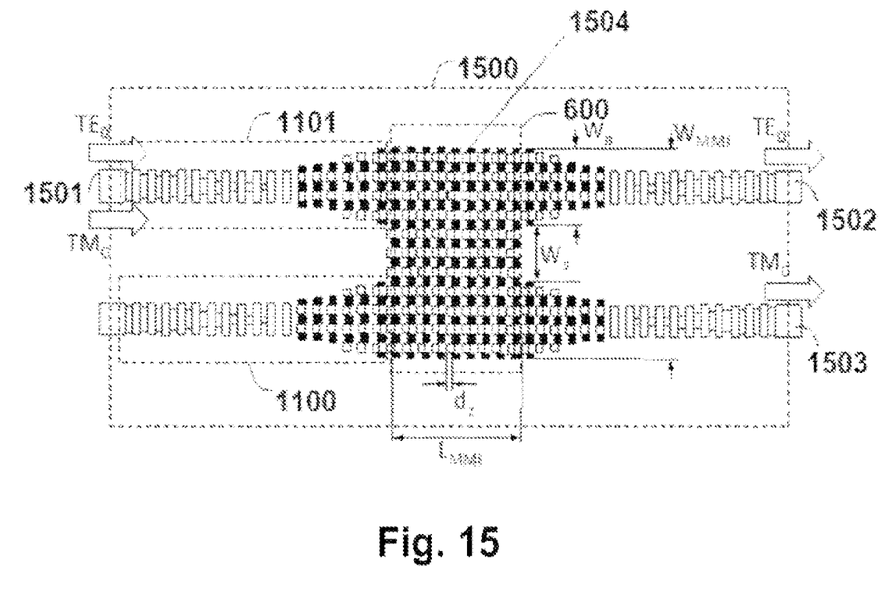
FIG. 15.—Shows a multi-mode interference coupler based on bricked sub-wavelength periodic waveguides operating as polarization splitter, in accordance with a preferred embodiment of the invention.

In FIG. 15 there is shows a preferred embodiment of a polarization splitter (1500) corresponding to the fourth aspect of the invention. For this application it is entered by an input guide (1501) with the fundamental modes of the two polarizations $TE_0$ and $TM_0$. The polarization splitter (1500) is designed to split both polarizations and cause the appearance of the $TE_0$ polarization in a first output waveguide (1502) and the $TM_0$ polarization in a second output waveguide (1503), with the minimum possible losses and maximizing the operating bandwidth.

For this application the periodic waveguide (600) is designed by means of optimization by photonic simulation so that the beat length of the TM mode ($L_{\pi TM}$) is an integer number of times larger than the beat length of the TE mode ($L_{\pi TE}$), preferably twice as large. With the aim of optimizing the focusing of the self-images of the TE and TM modes in the first output waveguide (1502) and the second output waveguide (1503) respectively, the total length of the multimode interference coupler is three times greater than $L_{\pi TM}$ and six times greater than $L_{\pi TE}$. Between the input waveguide (1501) and the periodic waveguide (600), modal adapters (1100) should be used to facilitate the transition.

Preferred embodiments of the third and fourth aspects of the invention described above make use of an MMI (1206, 1504) in a 2×2 configuration. However, other configurations are possible, such as 1×2, 1×4, 2×3, 3×3 or 2×4, all of them featuring in the central area a sub-wavelength periodic waveguide (600) of bricked aspect. The dimensions in each case will depend on the application for which they are intended It is to be noted that the preferred embodiments of the device, both the periodic waveguide (600) of bricked aspect, first object of invention and of the associated systems making use thereof (power divider (1200) 3 dB/90° and polarization splitter (1500) based on said periodic waveguide (600)) are preferably implemented in silicon on insulator, SOI, to thus benefit from the high contrast of index of SOI.

However, particular embodiments could be implemented on other different photonic platforms. That is to say, all the waveguides used in the various embodiments, be it conventional waveguides (100) or periodic waveguides (600) are preferably realized by means of core of silicon, deposited on an insulating layer such as, for example, silicon dioxide. The cover material (604) may vary for different embodiments of the invention, some of the possibilities being silicon dioxide, polymers or air, without this list limiting the use of other possible options.

Regarding the manufacturing of the proposed devices, it is to be noted that the sub-wavelength periodic waveguides (600) of bricked aspect, regardless of the shift '$d_z$', do not increase the difficulty or the number of steps with respect to the manufacturing of conventional waveguides (100). That is to say, all the structures used by the power divider (1200) 3 dB/90° and the polarization splitter (1500) objects of the invention can be manufactured by means of a single full-depth exposure step of any conventional microelectronics etching technique, such as, for example, by means of electron beam exposure (e-beam) or deep-UV exposure.

In view of this description and figures, the person skilled in the art will understand that the invention has been described according to some preferred embodiments thereof, but that multiple variations may be introduced in said preferred embodiments, without departing from the object of the invention as it has been claimed.

What is claimed is:

1. A bricked sub-wavelength periodic waveguide through which a wave propagates in a propagation direction, the periodic waveguide comprising:
    a substrate on which there is arranged a plurality of blocks of a core material arranged in a periodic manner with a period '$\Lambda_z$' in the propagation direction, and a cover material, arranged between and on the plurality of blocks, there being first blocks of width '$a_x$' and second blocks of width '$b_x$', alternating on the substrate perpendicularly to the propagation direction according to a period '$\Lambda_x$', and the second blocks being shifted a distance '$d_z$' in the propagation direction with respect to the first blocks,
    wherein the period '$\Lambda_z$' fulfills:

$$\Lambda_z < \lambda/(2 \cdot n_{\mathit{eff}})$$

$\lambda$ being the wavelength of the wave that propagates through the periodic waveguide and $n_{\mathit{eff}}$ being an effective mode index.

2. The periodic waveguide according to claim 1, wherein the shift '$d_z$' of the second blocks of width '$b_x$' is selected such that a first effective index ($n_{TE}$) of a zero-order transverse electric mode ($TE_0$) is different from a second effective index ($n_{TM}$) of a zero-order transverse magnetic mode ($TM_0$).

3. The periodic waveguide according to claim 1, wherein the shift '$d_z$' of the second blocks of width '$b_x$' is selected such that a first effective index ($n_{TE}$) of a zero-order transverse electric mode ($TE_0$) is equal to a second effective index ($n_{TM}$) of a zero-order transverse magnetic mode ($TM_0$).

4. The periodic waveguide according to claim 1, wherein the periodic waveguide is of a variable width (W).

5. The periodic waveguide according to claim 1, wherein the periods ($\Lambda_z$ and $\Lambda_x$) according to which the blocks are arranged are variable in the propagation direction and in the direction perpendicular to the propagation direction.

6. The periodic waveguide according to claim 1, wherein the distance ($d_z$) is variable in the propagation direction.

7. The periodic waveguide according to claim 1, wherein the cover material and the plurality of blocks of core material feature constant geometrical properties along the length of the waveguide.

8. The periodic waveguide according to claim 1, wherein the cover material and the plurality of blocks of core material feature variable geometric properties along the length of the waveguide.

9. The periodic waveguide according to claim 1, wherein the blocks are of silicon and the substrate is an insulating material in a silicon-on-insulator (SOI) configuration.

10. The periodic waveguide according to claim 1, wherein the cover material is a material selected from silicon dioxide, polymer and air.

11. The periodic waveguide according to claim 1, wherein the blocks are of silicon and the cover material is a polymer that features a variation of the refractive index changing with temperature of sign opposite to the variation of the refractive index of the silicon.

12. The periodic waveguide according to claim 11, wherein a ratio of cover material to block material within a period '$\Lambda_z$' is selected such that a variation with temperature of a first effective index ($n_{TE}$) and a second effective index ($n_{TM}$) is minimized.

13. A modal adapter for wave transverse electric mode (TE) and transverse electric mode (TM),
the modal adapter using a periodic waveguide, the periodic waveguide comprising:
a substrate on which there is arranged a plurality of blocks of a core material arranged in a periodic manner with a period '$\Lambda_z$' in a propagation direction, and a cover material, arranged between and on the plurality of blocks, there being first blocks of width '$a_x$' and second blocks of width '$b_x$', alternating on the substrate perpendicularly to the propagation direction according to a period '$\Lambda_x$', and the second blocks being shifted a distance '$d_z$' in the propagation direction with respect to the first blocks,
the modal adapter comprising
a first zone of conversion from a conventional waveguide to a sub-wavelength, SWG, waveguide of the same width as the conventional waveguide and with a period in longitudinal direction '$\Lambda_z$', wherein the waveguide (SWG) comprises bars of core material alternating with a central bridge of core material, the bars and the central bridge being arranged on a substrate, and wherein the central bridge progressively decreases in width until it disappears,
a second zone of conversion of the SWG waveguide resulting from the first zone into the periodic waveguide, wherein the shift '$d_z$' of the second blocks varies from an initial value equal to zero to a final value.

14. The modal adapter of claim 13, wherein the width of the periodic waveguide gradually increases to a final width value.

15. A device comprising:
at least one input waveguide,
at least a first output waveguide,
at least a second output waveguide,
a multi-mode interference device comprising a periodic waveguide in its central part,
at least a first modal adapter, arranged between the at least one input waveguide and the multimode interference device, and
at least a second modal adapter, arranged between the multimode interference device and at least one of the first and second output waveguides;
wherein the periodic waveguide comprises
a substrate on which there is arranged a plurality of blocks of a core material arranged in a periodic manner with a period '$\Lambda_z$' in a propagation direction, and a cover material, arranged between and on the plurality of blocks, there being first blocks of width '$a_x$' and second blocks of width '$b_x$', alternating on the substrate perpendicularly to the propagation direction according to a period '$\Lambda_x$', and the second blocks being shifted a distance '$d_z$' in the propagation direction with respect to the first blocks, and
wherein the at least the first modal adapter and the at least the second modal adapter each comprise a modal adapter type, the modal adapter type comprising:
a first zone of conversion from a conventional waveguide to a sub-wavelength, SWG, waveguide of the same width as the conventional waveguide and with a period in longitudinal direction '$\Lambda_z$', wherein the waveguide (SWG) comprises bars of core material alternating with a central bridge of core material, the bars and the central bridge being arranged on a substrate, and wherein the central bridge progressively decreases in width until it disappears, and
a second zone of conversion of the SWG waveguide resulting from the first zone into the periodic waveguide, wherein the shift '$d_z$' of the second blocks varies from an initial value equal to zero to a final value.

16. The device according to claim 15,
further comprising a third modal adapter arranged between the multimode interference device and the second output waveguide;
wherein the device is a polarization splitter of wave transverse electric mode and transverse magnetic mode;
wherein the at least one input waveguide receives wave transverse electric mode and transverse magnetic mode, the first output waveguide is for the polarization of the transverse electric mode, the second output waveguide is for the polarization of the transverse magnetic mode, and the second modal adapter being arranged between the multimode interference device and the first output waveguide;
wherein the third modal adapter comprises the modal adapter type.

17. The device according to claim 15, wherein the device is a power divider; wherein: the at least one input waveguide receives a wave transverse electric mode, the first output waveguide is for the output transverse electric mode and with a power portion of the output transverse electric mode, and the second output waveguide is for the output transverse electric mode and with the remaining portion of power of the output transverse electric mode out of phase by a certain amount with respect to the output transverse electric mode of the at least a first output waveguide.

18. The periodic waveguide according to claim 1, wherein its diagonal tensor ($\tilde{n}$) is given by an expression of the form:

$$\tilde{n} = \begin{bmatrix} \tilde{n}_{xx}(d_z) & 0 & 0 \\ 0 & \tilde{n}_{yy} & 0 \\ 0 & 0 & \tilde{n}_{zz}(d_z) \end{bmatrix}$$

-continued where:

$$\tilde{n}_{xx}(d_z) = \frac{1}{2}\left(n_{xx} + \sqrt{n_{xx} \cdot n_{zz}}\right) + \frac{1}{2}\left(n_{xx} - \sqrt{n_{xx} \cdot n_{zz}}\right) \cdot \cos\left(2\pi \frac{d_z}{\Lambda_z}\right)$$

$$\tilde{n}_{yy} = n_{yy}$$

$$\tilde{n}_{zz}(d_z) = \frac{n_{xx} \cdot n_{zz}}{\tilde{n}_{xx}(d_z)}$$

$[n_{xx}, n_{yy}, n_{zz}]$ being the components of a diagonal tensor (n) of the equivalent homogeneous anisotropic medium of a sub-wavelength structure.

\* \* \* \* \*